United States Patent
Galutva et al.

[15] 3,684,904
[45] Aug. 15, 1972

[54] DEVICE FOR PRECISION DISPLACEMENT OF A SOLID BODY

[72] Inventors: Gennady Vasilievich Galutva, Leninsky raion, poselok Mosrentgen, 6, kv. 11; Alek Iosifovich Ryazantsev, Leninsky raion, poselok Mosrentgen, 8a, kv. 28, both of Moskovskaya oblast; Gennady Stepanovich Presnyakov, Belyaevo-Bogorodskoe, kvartal 46-47, korpus 54, kv. 62; Jury Konstantinovich Modestov, ulitsa Tolbukhina, 5, korpus 1, kv. 73, both of Moscow, all of U.S.S.R.

[22] Filed: April 15, 1970

[21] Appl. No.: 28,746

[30] Foreign Application Priority Data

April 24, 1969 U.S.S.R. ................1324051

[52] U.S. Cl. .............310/8.0, 310/8.3, 310/8.1, 310/8.6, 310/26, 318/118, 318/135
[51] Int. Cl. .............................................H01v 7/00
[58] Field of Search.............310/8, 8.3, 8.5, 8.6, 8.7, 310/12, 13, 14, 25, 26, 2, 8.1; 318/118, 135

[56] References Cited

UNITED STATES PATENTS

| | | | |
|---|---|---|---|
| 3,217,218 | 11/1965 | Steele | 318/118 |
| 2,506,141 | 5/1950 | Drouin | 318/118 |
| 3,551,764 | 12/1970 | Evans | 310/8.1 X |
| 3,390,559 | 7/1968 | Steutzer | 310/8.6 X |
| 3,138,749 | 6/1964 | Stibitz | 310/26 X |

*Primary Examiner*—J. D. Miller
*Assistant Examiner*—Mark O. Budd
*Attorney*—Holman & Stern

[57] ABSTRACT

A device for precision displacement of a solid body with respect to a bearing surface, having at least two supports of elastic material, each of the supports being rigidly fixed at one end thereof to the displaceable solid body, and at least two drive means for ensuring independent movement of the ends of each support both in the direction perpendicular to the bearing surface, and in the direction of movement of the solid body.

3 Claims, 5 Drawing Figures

PATENTED AUG 15 1972

INVENTORS
G. V. GALUTVA ET AL

Holman, Glascock, Downing & Seebold

ATTORNEYS

INVENTORS
G. V. GALUTVA ET AL
Holman, Glascock, Downing & Seibold
ATTORNEYS 3,684,904

DEVICE FOR PRECISION DISPLACEMENT OF A SOLID BODY

BACKGROUND OF THE INVENTION

The invention relates to precision engineering, and more particularly it relates to devices for precision movement of solid bodies, that are used, for example, in coordinate measuring machines, microscopes, optical-mechanical instruments, in the process equipment of the semi-conductor industry, and in instruments for researching outer space.

PRIOR ART

Known in the art are devices for precision displacement of solid bodies, such as coordinate tables of coordinate measuring machines wherein a displaceable platform is connected with bearing surface through sliding mechanisms (dovetail-type guides) or rolling mechanisms (ball-bearing or roller-bearing systems). The platform is moved by a drive means, which usually includes an electric motor, a reduction gear, and a pair of cooperating threaded members.

During movement in coordinate tables of this type, there occurs rolling friction or sliding friction both in the places of contact of the platform with the bearing surface, and in the drive means. Additionally, in the reduction gear and the pair of threaded members of the drive a greater or lesser play is observed, which affects the dynamic characteristics of the system, particularly in the reversing moment.

Due to the combined effect of the play and friction, the movement of the platform at the moment of stopping, i.e. at velocities approximating zero, is nonuniform and jerky, which reduces the accuracy of stopping to a value of 1–4 microns.

SUMMARY OF THE INVENTION

The object of the present invention is to provide a device for a precision displacement of a solid body, in which the effect of friction on the accuracy of movement is eliminated or ultimately reduced, and at the same time maintaining a wide range of movement.

According to the above and other objects of the invention, the device for a precision displacement of a solid body with respect to a bearing surface comprises, according to the invention, at least two supports of elastic material, each of which is rigidly fixed at one end thereof to the displaceable solid body, and at least two drive means for each support to ensure independent movement of the ends of each support both in the direction perpendicular to the bearing surface, and in the direction of movement of the solid body.

Advantageously, said means comprises a control unit providing for the movement of the free ends of the supports, and transducers to convert the signals of the control unit into displacement, with at least two transducers being secured on each support, the first transducer being mounted so as to provide for displacement of the free ends of the supports in the direction perpendicular to the bearing surface, while the second transducers are mounted so as to effect displacement of the free ends of the supports in the direction of movement of the solid body.

Employed as transducers of the control unit signals into displacement can be piezoelectric, magnetostrictive, or other transducers.

BRIEF DESCRIPTION OF THE DRAWINGS

The invention is now exemplified with the following detailed description of particular embodiments thereof taken in conjunction with the appended drawings, wherein.

DETAILED DESCRIPTION OF THE INVENTION

Figures 2, 5:
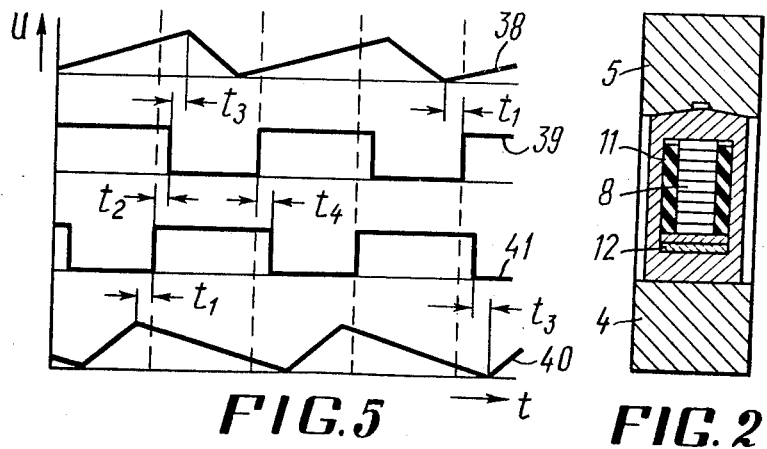
FIG. 2 is a transverse sectional view taken along linesII—II in FIG. 1.
FIG. 5 shows diagrammatically electric signals arriving from the control unit at the piezoelectric transducers.

The device for precision displacement of a solid body 1 (FIG. 1) comprises two supports 2 and 3 rigidly fixed to opposite sides of the solid body 1 and contacting the bearing surfaces, which in the present case comprises the inner surfaces of bars 4 and 5. The surface of bar 4 is plane, while the surface of bar 5 comprises two planes located at an angle to each other, as is shown in FIG. 2. Such a shape of the bearing surfaces confines the number of degrees of freedom of the displaceable solid to one (longitudinal movement). Bars 4 and 5 are immovably fixed parallel to each other, being spaced so that a clearance 6 of the order of 0.5 – 2 mu is formed between the contact surfaces of supports 2 and 3, and the surfaces of bars 4 and 5 when the supports are not strained. Immovably mounted inside supports 2 and 3 are piezoelectric transducers 7 and 8, 9 and 10, respectively. Each of the piezoelectric transducers consists of a plurality of piezoceramic disks assembled into a stack. On the edges of the disks there are plates to which voltage is fed from a control unit (not shown in FIG. 1). The stacks are enclosed in dielectric casings 11 and placed in appropriate cutouts made in supports 2 and 3. The stacks are pressed against the inner surfaces of the cutouts in supports 2 and 3 by means of wedge pairs 12.

Employed as the control unit may be any generator of square and saw-toothed pulses provided with a regulator of pulse duration and relative phase shift.

Figure 3:
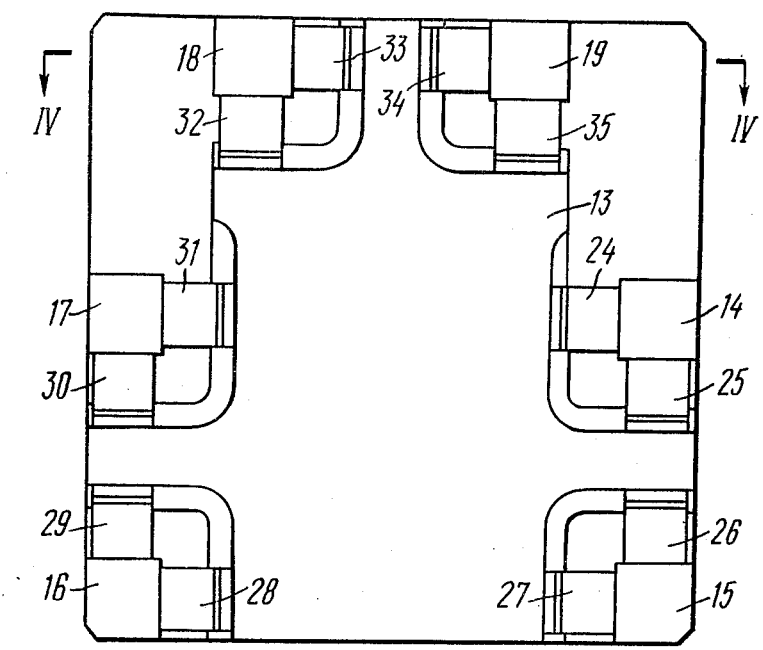
FIG. 3 is a general view of a device for precision displacement of a solid body with three degrees of freedom, according to the invention.
Figure 4:
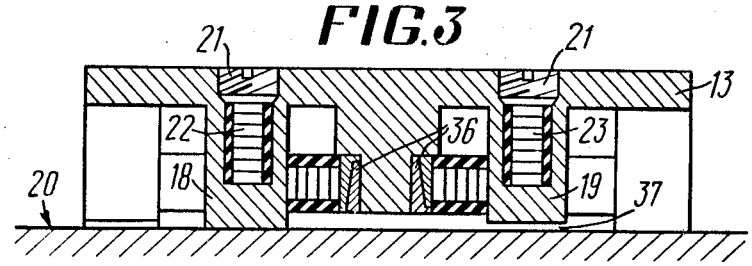
FIG. 4 is a transverse sectional view taken along lines IV—IV in FIG. 3.

Shown in FIGS. 3 and 4 is an alternate embodiment of the device for precision displacement of a solid body 13 with three degrees of freedom (displacement in a plane). Unlike the embodiment shown in FIG. 1, the present embodiment comprises six supports 14, 15, 16, 17, 18, 19. Each support has the form of a square-shaped pillar. The top ends of supports 14 – 19 are rigidly secured to the solid body 13, while the bottom ends of supports 14 – 19 periodically contact a bearing surface 20, which is a plane. Inside each of the supports 14 – 19 there is a hole, in which vertically disposed is a piezoelectric transducer compressed by a screw plug 21. Seen in FIG. 4 are two such transducers 22 and 23. Additionally, pressed to each of supports 14 –19 in its bottom part are two more piezoelectric transducers 24–25, 26–27, 28–29, 30–31, 32–33, 34–35, respectively, whose axes are located horizontally at an angle of 90° to each other. These transducers are clamped by wedge pairs 36 similar to those described in the first embodiment of the device. When there is no deformation of the supports 14–19, a clearance 37 is formed between the contact surfaces of the latter and the bearing surface 20.

The device shown in FIGS. 1 and 2, operates as follows.

To effect continuous ydisplacement of the solid body 1, voltage pulses are, at regular intervals, fed from the control unit to the piezoelectric transducers 7–10. The shape of pulses and their phase relationship are qualitatively shown in FIG. 5, wherein the x-axis is time $t$, and the y-L -axis is voltage $\mu$ on the respective piezoelectric transducer. Pulses 38 are fed to the piezoelectric transducer 7, and the rest are applied, respectively: pulse 39 to transducer 8, pulse 40 to transducer 9, and pulse 41 to transducer 10.

Figure 1:
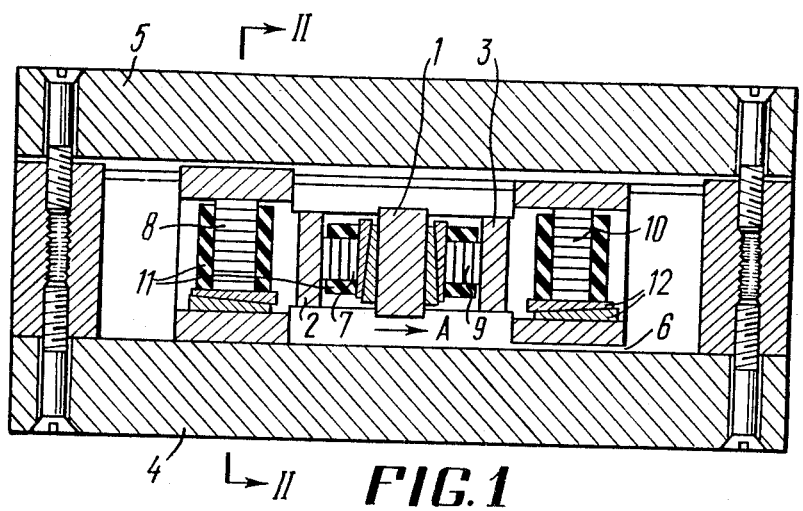
FIG. 1 is a general view of a device for precision displacement of a solid body with one degree of freedom, according to the invention.

The pattern of pulses shown in FIG. 5 corresponds to a continuous displacement of the solid body 1 in the direction indicated by arrow A in Fig. 1. Applied to the piezoelectric transducer 8 is voltage 39 in the form of a square pulse, which, by the inverse piezoelectric effect, causes axial expansion of the stack, and elastic deformation of the support 2. The piezoelectric transducer develops a force sufficient to deform the rigid supports. On the account of the elastic deformation, the contact surfaces of support 2 are pressed to the bearing surfaces of bars 4 and 5, with the clearances 6 thus closed. The support 2 is shown in FIGS. 1 and 2 as being pressed to the bearing surfaces of bars 4 and 5. As this takes place, fed to the piezoelectric transducer 7 is a continuously rising voltage 38, which on the account of the elastic deformation of the horizontal section of support 2 causes a rightward displacement along arrow A of the solid body 1 together with its support 3, with the latter at this moment having no contact with the bearing surfaces of bars 4 and 5, i.e. suffering no friction.

At the same time fed to the piezoelectric transducer 9 is a maximum voltage 40, which then starts monotonically diminishing. This leads to the free end of support 3 being displaced leftwards, i.e. toward the solid body 1. Since the rate of this displacement equals the rate of the rightward movement of the solid body 1, the contact surface of support 3 in this case turns out to be immovable with respect to the bearing surfaces of bars 4 and 5.

This is why a short time $t_1$ after the beginning of the diminishing section of voltage 40 at the piezoelectric transducer 9, voltage 41 can be applied to the piezoelectric transducer 10 to cause pressing of support 3, too, to the bearing surfaces of bars 4 and 5. Pressing occurs without any jerk, since at this moment the support 3 is immovable relative to the bearing surfaces of bars 4 and 5. Within a certain time $t_2$, the solid body 1 moves with two pressed up supports due only to elastic deformation of the horizontal sections of supports 2 and 3.

Then voltage is relieved from the piezoelectric element 8, with clearance 6 being thus formed between the bearing surfaces of bars 4 and 5, and support 2. After a short time interval $t_3$LIGHT, voltage 38 is removed from the piezoelectric transducer 7, causing a rightward displacement of the free end of support 2, and its approach to the solid body 1, which at this time moves rightwards on the account of elastic deformation of support 3. The displacement of the free end of support 2 does not either involve any friction, for at this moment it is not in contact with the bearing surfaces of bars 4 and 5.

After a relatively rapid drop to a minimum, of voltage 38 across the piezoelectric element 7, there again starts a continuous rise of voltage 38, as a result of which the free end of support 2 again turns out to be immovable with respect to the bearing surfaces of bars 4 and 5. This permits, after some time, applying voltage 39 to the piezoelectric transducer 8, so that within a certain time $t_4$, the solid body 1 again moves with two pressed up supports 2 and 3, whereupon voltage 41 is relieved from the piezoelectric transducer 10, with the above-described cycle being resumed.

Thus, a continuous displacement of the solid body 1 is realized, with the absence of jerks being achieved due to a certain overlapping in the action of both of the supports 2 and 3. The limits of displacement are determined by the length of the bearing surfaces, and the rate of movement depending on the frequency and amplitude of pulses arriving from the control unit. In real systems a voltage of the order of 500 volts corresponds to a deformation of about 1 mu, which at a frequency of 10 kc makes possible obtaining velocities of several hundred of mm/min. Smooth adjustment of velocity within a wide range (from maximum to zero) is effected by reducing the pulse amplitude, which is quite suitable for automatically controlled systems. Thus, owing to the absence of friction, and the possibility of realizing extremely small step displacements, the proposed device permits providing positioning accuracies of the order of $10^{-3}$ mu.

The quite small value of elastic deformation allowing of "quantizing" the movement, makes it possible to realize simultaneous deformation of the supports in three directions, thus obtaining an embodiment of the device for precision displacement of a solid body with three degrees of freedom.

The operation of the device illustrated in FIGS. 3 and 4, is similar to that described above.

The square pulses are fed to the six vertically disposed piezoelectric transducers located in the holes of supports 14,15,16,17,18,19, while the saw-toothed pulses are fed to the twelve horizontally disposed piezoelectric transducers 24–35. Voltage is applied at the same time to three vertical piezoelectric transducers in supports 14,16, and 18. Due to elastic deformation of these supports, the solid body 13 is lifted, and formed between supports 15, 17, 19, and the bearing surface 20 is a clearance 37 equaling the value of elastic deformation of supports 14,16, and 18. In such position, applying voltage simultaneously to three horizontal piezoelectric transducers 24,28, and 33, or 25, 29, and 32, of supports 14, 16, and 18 causes displacement of the solid body 13 with respect to the bearing surface 20. The presence of two horizontal piezoelectric transducers on each support permits moving the solid body 13 along two coordinates in the horizontal plane. The range of movement is determined by the size of the bearing surface 20.

The shape of the pulses and their phase relationship are similar to the first embodiment.

The solid body is fixed on three supports due to its own weight, although whenever friction must be raised in the contact spots, a magnetic plate may be employed as the bearing surface, and the solid body can be made of magnetic material.

Such a device can be used in a closed system with a feedback as to both coordinates and the angle of turn about the vertical axis. Measurement of the displacement can be done by the most accurate systems, e.g., laser interferometers.

To attain the desired deformation, in both embodiments of the device, the inverse piezoelectric effect was used, but other phenomena, for example, magnetostriction, can as well be utilized for the same purpose.

The advantages of the present invention consist in that the device for a precision displacement of a solid body permits rolling and sliding friction to be ultimately reduced or completely eliminated both in the places of contact with the bearing surface, and in the drive, within a wide range of movement. At the same time, the device is simpler in design and in production, as compared to the existing types, particularly in its second embodiment, which substitutes for complex coordinate table with two-storey guides. Also, the reduced number of dimension chains between the bearing surfaces and the working surface of the solid body entails lesser thermal deformations of the device. It should be noted, that in the second embodiment, there is a possibility of maintaining a constant accuracy of the solid body's position through compensating for the variation of the temperature of the supports by introducing an appropriate constant component into the signal fed to the vertical piezoelectric transducers. In principle, the present device permits realizing the high accuracies of measurement reached by laser interferometers. What is more, the present device makes it possible, without employing any additional mechanisms in the drive chain, to carry out movement within a wide range of speeds (from 0 to hundreds of mm/min).

What we claim is

1. A device for a precision displacement of a solid body with respect to a bearing surface, comprising at least two supports of elastic material, each of said supports being rigidly fixed at one end thereof to said solid body, and at least two drive means for each support to ensure independent movement of the ends of each support both in the direction perpendicular to said bearing surface, and in the direction of movement of said solid body.

2. The device, as claimed in claim 1, wherein said drive means comprises a control unit providing for the alternate displacement of the ends of said supports, and transducers to convert the signals of said control unit into such displacements, at least two transducers being secured on each said support, the first of said transducers being mounted so as to provide for displacements of the ends of said supports in the direction perpendicular to said bearing surface, while the second of said transducers are mounted so as to effect displacement of the ends of said supports in the direction of movement of said solid body.

3. The device, as claimed in Claim 2, wherein employed as said transducers of the control unit signals into displacement are piezoelectric transducers.

* * * * *